United States Patent [19]

Iwamoto et al.

[11] Patent Number: 5,046,826
[45] Date of Patent: Sep. 10, 1991

[54] ILLUMINATOR AND DISPLAY PANEL EMPLOYING THE ILLUMINATOR

[75] Inventors: Hirofumi Iwamoto, Hiratsuka; Takashi Yamamoto, Atsugi; Yoshihiro Onitsuka, Yokohama; Tadashi Mihara, Kawasaki, all of Japan

[73] Assignee: Canon Kabushiki Kaisha, Tokyo, Japan

[21] Appl. No.: 244,299

[22] Filed: Sep. 15, 1988

[30] Foreign Application Priority Data

Sep. 19, 1987 [JP] Japan .............................. 62-235993
Oct. 21, 1987 [JP] Japan .............................. 62-265999

[51] Int. Cl.$^5$ ............................................ G02F 1/133
[52] U.S. Cl. ...................................... 359/49; 359/69; 359/106; 362/31
[58] Field of Search .................... 350/345, 338, 339 D, 350/334, 350 S; 362/26, 27, 31, 327, 328, 329, 331

[56] References Cited

U.S. PATENT DOCUMENTS 4,367,924 1/1983 Clark et al. .......................... 350/334
4,642,736 2/1987 Masuzawa et al. .................... 362/31
4,659,183 4/1987 Suzawa .............................. 350/345

Primary Examiner—Stanley D. Miller
Assistant Examiner—Anita Pellman Gross
Attorney, Agent, or Firm—Fitzpatrick, Cella, Harper & Scinto

[57] ABSTRACT

An illuminator comprises a light-transmitting member formed of a plurality of transparent sheet-like members laminated to each other, a light source disposed on the light-incoming side of the light-transmitting member, a light-reflecting member disposed on the light-outgoing side of the light-transmitting member at an oblique angle to the transparent sheet-like members, and a sheet-like member having a scattering area at which a light ray reflected from the light-reflecting member is converted into scattered light and coming into surface contact with the light-transmitting member.

11 Claims, 7 Drawing Sheets

ILLUMINATOR AND DISPLAY PANEL EMPLOYING THE ILLUMINATOR

BACKGROUND OF THE INVENTION

1. Field of the Invention

The present invention relates to an illuminator, and, more particularly, to an illuminator that can be applied to a backlighting source device of a display panel employing a ferroelectric liquid crystal.

2. Related Background Art

In a liquid crystal display panel, an irregular-reflection plate is disposed on the back surface of the panel and electro-optical modulation is identified by using a light reflected therefrom, or an illuminator is disposed on the back surface and light rays from the back surface are controlled by the switching operation of a liquid crystal, so that the display can be identified. In general, the former is called a reflective type liquid crystal display panel, and the latter, a transmissive type liquid crystal display panel. The reflective type liquid crystal display panels and transmissive type liquid crystal display panels have advantages respectively inherent therein. Particularly the transmissive type liquid crystal display panels are suited for their application in display units of office instruments.

The transmissive type liquid crystal display panels have hitherto employed an illuminator as illustrated in FIG. 13. More specifically, in FIG. 13, a panel is so constituted that light rays from two light sources 1301 and 1302 may be totally reflected on each of a surface-reflection surface 1304 and a minute prism reflection surface 1305 in a transparent light-transmitting member 1303, thereafter being transmitted through the surface-reflection surface 1304 and through a light-scattering member 1306, and being converted into scattered light there, so that a liquid crystal display panel 1307 can be illuminated from its back surface. The numeral 1308 denotes a housing that supports the light source 1301, the light-transmitting member 1303 and so forth. The liquid crystal display panel 1307 is provided, on its top and bottom, with two sheets of polarizers, which, however, are not shown in the drawing. Driving circuit boards, fixing members or the like to be connected to the liquid crystal display panel 1307 are also omitted (The same applies herein).

However, in an illuminator 1300 employing such a light-transmitting member 1303, there have been several problems. For example, beams from the light-sources 1301 and 1302 can be utilized at a low rate, and hence a large electric power to be consumed is required in order to brightly illuminate the liquid crystal display panel 1307; moreover, since lights from the light-sources 1301 and 1302 spread in a radial form, the lights are transmitted from the light-transmitting member 1303 in a large amount in the vicinity of the light-sources 1301 and 1302; and the lights are transmitted from the light-transmitting member 1303 in a small amount at a position distant from the light-sources 1301 and 1302, thus making it difficult to effect uniform surface illumination.

For these reasons, conventionally used has been an illuminator as illustrated in FIG. 14. This illuminator is of the twin-lamp type in which light sources and light-transmitting members are disposed one by one on the right and the left. Because of symmetrical positional relationship and the same functions, description will be made below only of light-source 1401-1 and a light-transmitting member 1402-1 which are located on one side. More specifically, in FIG. 14, the numeral 1402-1 denotes the light-transmitting member having the structure that a number of transparent sheet-like members 1407 formed of, for example, polymethyl methacrylate (PMMA) or glass sheets are laminated to each other with use of an adhesive or the like. They are laminated interposing an air layer, or an adhesive layer having a smaller refractive index than PMMA, in order to prevent crosstalk between the transparent sheet-like members. Also, the numeral 1403-1 denotes a light-reflecting member comprised of, for example, a film having a mirror surface, which member is so disposed as to surround the circumference of the light source 1401-1 so that the beams can be utilized at a high rate. Part A of light rays emitted from the light-source 1401-1 travels directly to the light-transmitting member 1402-1, propagates through the transparent sheet-like member 1407 from one end thereof while repeating the total reflection, exits from the other end of the transparent sheet-like materials 1407, reflected on the surface of the light-reflecting member 1403-3, passes through a light-scattering member 1404, and is converted into scattered light there, thus illuminating a liquid crystal display panel 1405 from its back surface. Another part B of the light rays reaches the reflection surface of the light-reflecting member 1403-1, and, after it is reflected there, returns again to the surface of the light-source 1401-1, and then passes through its inside and exits through the surface of the opposite side, and comes in the light-transmitting member 1402-1 as shown by B. In a final stage, this light ray also exits from the light-scattering member 1404. In other words, the light rays that have substantially equally travelled through the light-transmitting member 1402-1 from an end thereof and exit through the bottom end in such a state that the light intensity is retained, and are reflected and with scattered so that there can be obtained uniform surface illumination. Thus, the illuminator 1400 shown in FIG. 14 has been particularly useful for uniform illumination of large liquid crystal display panels when used with the increased numbers of the transparent sheet-like members 1407 in the light-transmitting member 1402-1.

To solve the problems in the illuminator illustrated in FIG. 13, an illuminator as illustrated in FIG. 15 is also used.

In FIG. 15, a light-reflecting member 1502 comprises, for example, a film having a mirror surface, and, in order to increase the utilization rate of beams, disposed on the inner wall of a housing 1505 in such a manner that it may surround light-sources 1501. The numeral 1503 denotes a light screen comprising, for example, a polyester film on which opaque materials are provided in the form of dots by vapor deposition or printing, and density distribution is formed on the part of the dot-like opaque materials so that the beams that come in the light screen may be brought into outgoing beams having uniform light distribution.

Part A of light rays emitted from the light-sources 1501 directly reaches and passes through the light screen 1503, and is converted into scattered light through a light-scattering member 1504, thus illuminating a liquid crystal display panel 1506 from its back surface. Another part B of the above light rays is reflected on the light-reflecting member 1502, and thereafter reaches the light screen 1503, and, in a final stage, this light ray B is also converted into scattered light through the light-scattering member 1504 and then outgone. The light rays emitted from the light sources 1501 may spread in a radial form around the light sources 1501, and the beams reaching the light screen 1503 may have different densities depending on the position of the surface at which beams come in the light screen 1503. Accordingly, forming the density distribution on the part of the opaque materials provided on the light screen 1503 makes uniform the density of the beams coming in the light-scattering member 1504, so that there can be obtained a surface light source free of non-uniformity in luminance. This illuminator also enables utilization of almost all of the light rays except that a part of light rays emitted from the light sources is intercepted at the opaque materials on the light screen 1503, thus making it possible to obtain a highly luminous surface light source. Moreover, a surface light source having a large area can be obtained by increasing the number of the light-sources 1501, and hence this illuminator has been useful for backlighting sources of large liquid crystal display panels.

Incidentally, the ferroelectric liquid crystal display panel described in U.S. Pat. No. 4,367,924 issued to Clark et al. enables liquid crystal display with a large area, but experiments made by the present inventors revealed that the alignment disturbance (hereinafter referred to as "sanded texture") that may undoubtedly cause a switching failure has been produced as a result of a drop impact test carried out as reported below after the ferroelectric liquid crystal display panel is fixed on the illuminators of FIG. 14 and FIG. 15 each.

Moreover, conventional illuminators, in which a light-transmitting member is required to be obliquely fixed at a given angle to the bottom surface of a housing and to a light-scattering member, have had the problems such that they require a member with which the light-transmitting member is pressed at its top surface and fixed, and assembly performance becomes poorer with an increase in the number of parts.

SUMMARY OF THE INVENTION

An object of the present invention is to provide an improved illuminator that can achieve a high utilization rate of beams from a light source and effect uniform illumination, and that may not cause any sanded texture in a drop impact test, and a display panel employing the same.

The present invention is in the first place characterized by an illuminator comprising (a) a light-transmitting member formed of a plurality of transparent sheet-like members laminated to each other, (b) a light source disposed on the light-incoming side of said light-transmitting member, (c) a light-reflecting member disposed on the light-outgoing side of said light-transmitting member at an oblique angle to said transparent sheet-like members, and (d) a sheet-like member having a scattering area at which a light ray reflected on said light-reflecting member is converted into scattered light and coming into surface contact with said light-transmitting member.

The present invention is in the second place characterized by an illuminator having a light source and a light-scattering member and illuminating from the back surface an object to be illuminated, wherein said light source is disposed in a hollow space formed in a light-transmitting member, said light-scattering member is disposed between said light source and said object to be illuminated, said light-transmitting member is formed of a solid material capable of propagating a light ray outgone from said light source toward said light-scattering member, and said hollow space is provided within an effective illumination region of said object to be illuminated.

DETAILED DESCRIPTION OF THE PREFERRED EMBODIMENTS

Embodiments of the illuminator according to the present invention will be described below with reference to the drawings.

Figure 1:
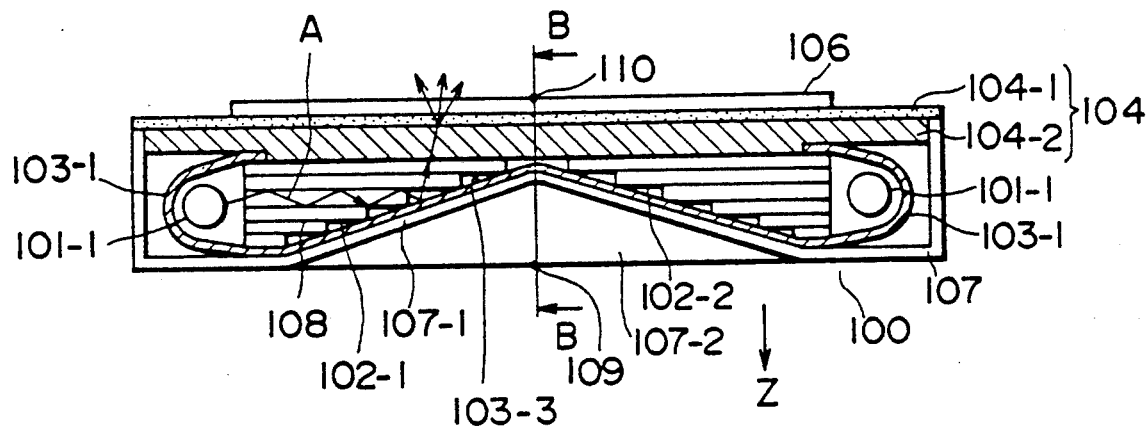
FIG. 1 is a cross section illustrating an illuminator of the present invention and a display panel employing the same.
Figure 14:
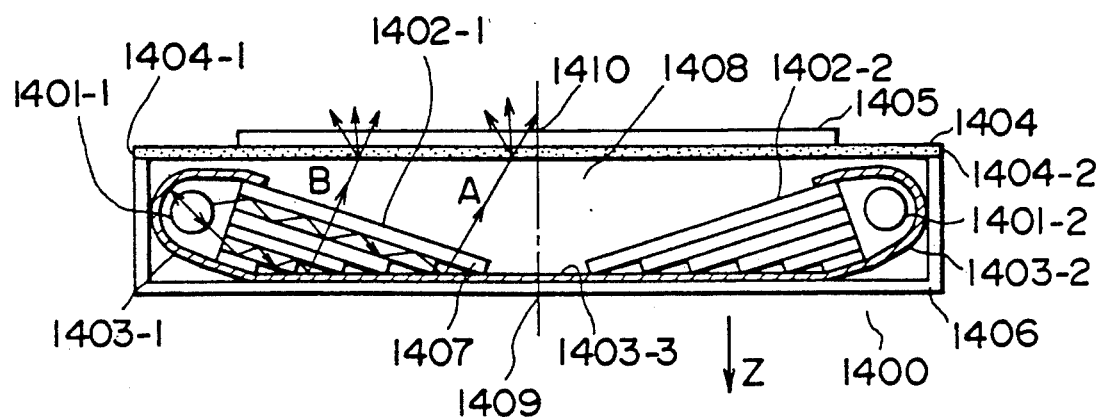
FIG. 14 is a cross section illustrating another conventional illuminator and a display panel employing the same.
Figure 15:
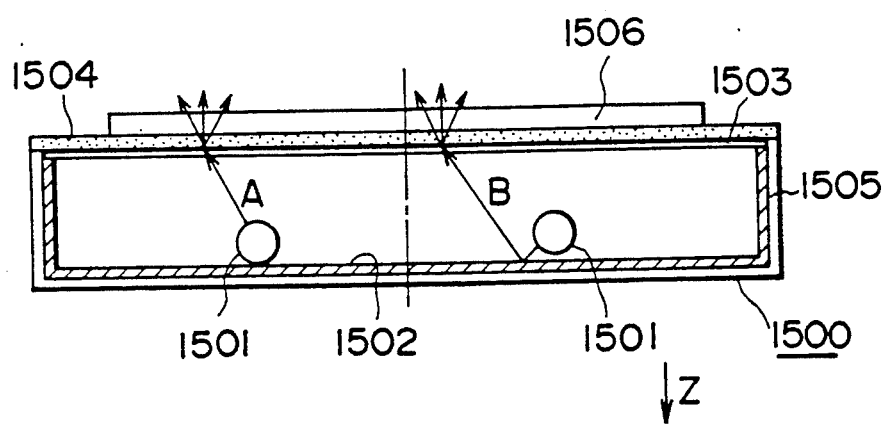
FIG. 15 is a cross section illustrating still another conventional illuminator and a display panel employing the same.

FIG. 1 is a cross section illustrating an illuminator of the present invention and a display panel employing the same, in which a light-transmitting member 102-1 according to the present embodiment takes the same constitution as that of the light-transmitting member 1402-1 of the prior art illustrated in FIG. 14, and comprises a plurality of transparent sheet-like members 108 formed of, for example, polymethyl methacrylate (PMMA) or glass sheets and laminated to each other with use of an adhesive or the like, where they are laminated interposing an adhesive layer having a smaller refractive index than PMMA, or an air layer, in order to prevent crosstalk between the transparent sheet-like members.

Next, a light-reflecting member 103 comprises film having a mirror surface, and can be obtained, for example, by forming a metal such as aluminum, chromium or silver into a film by vapor deposition. Part 103-3 of the light-reflecting member comes into contact with an outgoing end of the light-transmitting member 102-1, and disposed at an oblique angle to the transparent sheet-like member 108. This oblique angle may preferably be set to range from 5° to 35°. Also, part 103-1 of the light-reflecting member is arranged to surround the circumference of a light source 101-1 disposed on the light-incoming side of the light-transmitting member 102-1 so that beams can be utilized at a high rate. The present invention is characterized in that a light-scattering member 104 that is the sheet-like member has two functions. More specifically, the light-scattering member 104 has one function to convert reflected light from the light-reflecting member 103-3 into scattered light, and the other function to support a liquid crystal display panel 106 by coming into surface contact with the light-transmitting member 102-1. In the present embodiment, the light-scattering member 104 comprises a diffusion sheet 104-1 having the scattering function and a transparent or translucent member 104-2 having the panel-supporting function, and they are fixed each other through an adhesive. The diffusion sheet 104-1 can be made from a milk-white translucent substance. As such a substance, there can be used particularly surface-roughened PMMA or a glass sheet, or PMMA containing crystalline particles having a high refractive index. The transparent or translucent member 104-2 may desirably be made with PMMA or a glass sheet. The light-scattering member 104 may also desirably be fixed on the light-transmitting member 102-1 through an adhesive.

Figure 2:
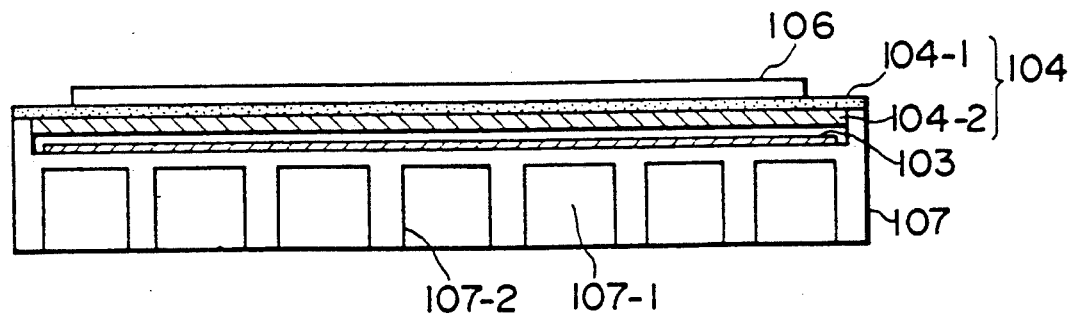
FIG. 2 is a cross section along the line B—B in FIG. 1.

In a housing 107, the bottom 107-1 of the housing is formed in the form of a taper or convex shape so that the bottom end of the light-outgoing surface of the light-transmitting member 102-1 may be brought into contact with the light-reflecting member 103-3. FIG. 2 is a cross section along the line B—B in FIG. 1, where a plurality of projections 107-2 are provided on the undersurface of the housing 107, thus giving the structure the shape of the undersurface 107-1 so it can not be deformed with ease even by impact force exerted in the direction Z.

Next, description will be made of the illuminator 100 illustrated in FIG. 1 and constituted as described above. The light ray A that has come in the light-incoming surface of the light-transmitting member 102-1 from a long-size light source 101-1 as exemplified by a fluorescent lamp travels through inside of the transparent sheet-like member 108 without leaking outside while repeating the total reflection. Subsequently, after exiting from the light-outgoing surface, it reflects upward on the light-reflecting member 103-3, and reaches the scattering sheet 104-1 through the the transparent or translucent member 104-2 and is converted into scattered light there, thus illuminating the liquid crystal display panel 106 from its back surface.

The present embodiment brings about the following advantages. Namely, since the light-scattering member 104 is closely fixed by surface contact to the light-transmitting members 102-1 and 102-2, the light-scattering member 104 may not vibrate even when the drop impact is given thereto, so that no excessive impact-acceleration may be given to the liquid crystal display panel 106. FIGS. 4A and 4B show impact waveforms observed when the same drop test as in the instance of FIG. 3 was carried out with respect to the illuminator 100 of the present invention on which the ferroelectric liquid crystal display panel 106 was mounted. Waveform B shown in FIG. 4B, of the impact-acceleration given to the central surface 110 of the ferroelectric liquid crystal display panel 106 is similar to the preset acceleration $G_1$ shown in FIG. 4A, of a drop test machine, proving that no sanded texture was generated in the ferroelectric liquid crystal display panel 106. In an instance in which the liquid crystal display panel 106 is kept apart from the light-scattering member 104 so as to be held upward, the liquid crystal display panel 106 must, as a matter of course, be supported and fixed by other means at its bottom periphery. Since in such an instance the liquid crystal display panel 106 is brought into a suspended state, and excessive impact-acceleration is applied to the liquid crystal display panel 106 when the drop impact is given thereto, resulting in appearance of sanded texture.

The transparent or translucent member 104-2 used in the present invention is positioned between the light-transmitting member 102-1 and the diffusion sheet 104-1. Accordingly, the thickness of the transparent or translucent member 104-2 may be so selected as to give a prescribed size for the distance between a reflection surface of the light-reflecting member 103 and the diffusion sheet surface that is a surface to be irradiated, so that it may not occur that borderlines between the transparent sheet-like members at the light-outgoing surface of the light-transmitting member 102-1 come out on the surface to be irradiated. Thus, there can be achieved surface illumination with a very uniform brightness. In the present embodiment, no borderline between the transparent sheet-like members enables uniform illumination, when the transparent or translucent member 104-2 has a thickness of not less than 6 or 7 mm.

Moreover, the light-transmitting member 102-1 in the present embodiment can be fixed, without inclination, to the housing 107 by lamination together with the light-scattering member 104, thus making it unnecessary to provide any fixing members conventionally required for fixing a light-transmitting member, and bringing about the advantage that the assembly performance is remarkably improved.

Figure 3A:
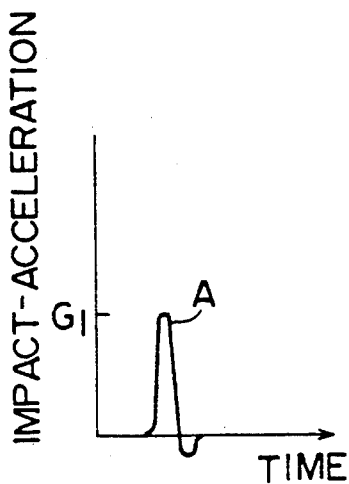
FIGS. 3A and 3B are characteristic graphs of waveforms of the drop impact exerted on a conventional illuminator and a display panel employing the same.
Figure 3B:
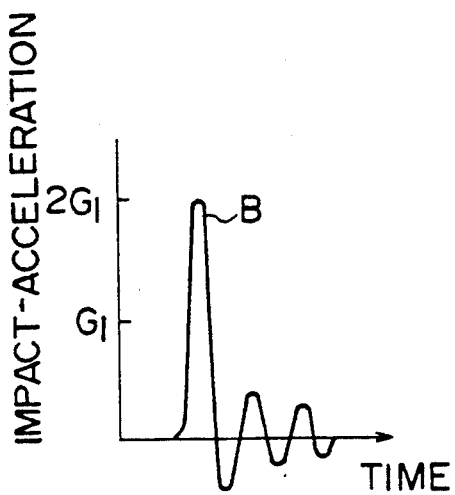
Figure 4A:
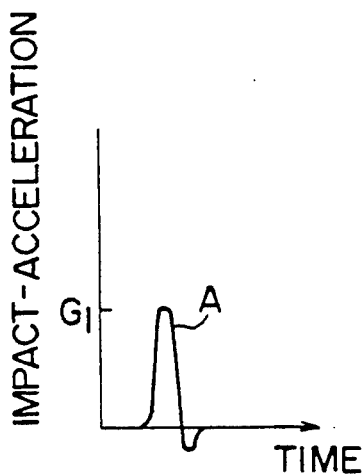
FIGS. 4A and 4B are characteristic graphs of waveforms of the drop impact exerted on an illuminator of the present invention and a display panel employing the same.
Figure 4B:
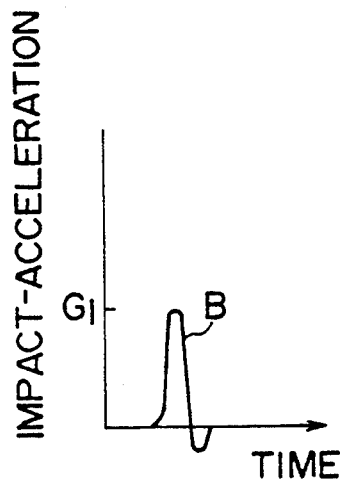

FIGS. 3A and 3B show impact waveforms observed when with the respect to the conventional illuminator 1400 illustrated in FIG. 14 on which the ferroelectric liquid crystal display panel 1405 was mounted, a drop test is carried out by means of a drop test machine (not shown) so that the preset acceleration $G_1$ may be applied to the illuminator 1400. "A" in FIG. 3A indicates a waveform of the impact-acceleration given to the bottom surface 1409 of the illuminator 1400, where a peak value is indicated by $G_1$, which is equal to the preset acceleration in the drop test machine. However, at the central surface 1410 of the ferroelectric liquid crystal display panel 1405, a peak value was doubled to $2G_1$ as shown by waveform B in FIG. 3B, resulting in disturbance of alignment and appearance of sanded texture. More specifically, in this illuminator 1400 the light-scattering member 1404 and the light-transmitting members 1402-1 and 1402-2 are kept apart, and hence there is a large vacant space 1408 between the both, so that the central part is suspended in such a state that only peripheral four sides 1404-1, 1404-2, etc. (sides perpendicular to the paper surface are not shown) of the light-scattering member 1404 are fixed to the housing 1406. For this reason, the impact-acceleration given to the liquid crystal display panel 1405 on the light-scattering member 1404 is increased as shown by waveform B in FIG. 3B, when the illuminator 1400 was dropped in the direction Z in FIG. 14.

Figure 5:
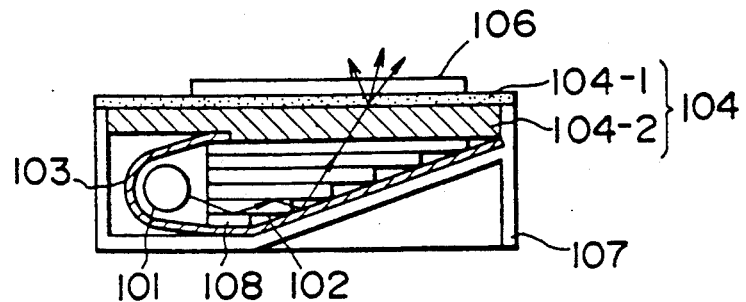
FIG. 5 is a cross section illustrating an illuminator as a second embodiment of the present invention and a display panel employing the same.

FIG. 5 illustrates a second embodiment of the present invention. In the figure, the same numerals as in FIG. 1 denote same members. The embodiment of FIG. 1 has the constitution of the so-called twin-lamp system in which the light source and the light-transmitting member each are used in pairs. This embodiment is an embodiment in which the present invention is applied to a one lamp system, and there can be obtained the same effects as in the twin lamp system. Also, increasing the lamination number of the transparent sheet-like members 108 that constitute the light-transmitting member 102 enables enlargement of the effective illumination area, thereby making it possible to provide an illuminator for a large area liquid crystal display panel, similarly in the twin lamp system.

Figure 6:
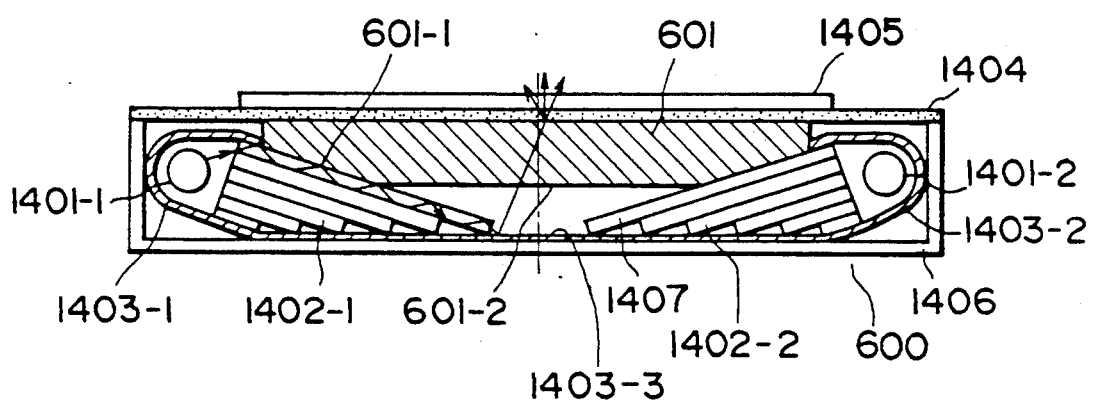
FIG. 6 is a cross section illustrating an illuminator 600 as a third embodiment of the present invention and a display panel employing the same.

FIG. 6 illustrates a third embodiment of the present invention, which is an embodiment in which a transparent or translucent member 601 incorporated into the conventional illuminator illustrated in FIG. 14. In the figure, the same numerals as in FIG. 1 denote same members. The transparent or translucent member 601 comes into surface contact with the light-transmitting member 1402-1 at part 601-1 of the undersurface in the like fashion as in FIG. 1 for the first embodiment, and fixed thereon through an adhesive, so that also in this instance any alignment disturbance such as sanded texture may not be caused by the drop impact. In particular, it is desirable for the contact area of the transparent or translucent member 601 coming into contact with transparent sheet-like members 1407 to be an area comprising 10% or more, preferably 30% or more, of the surface of the transparent sheet-like members 1407. Also, the undersurface 601-2 of the transparent or translucent member 601 may not necessarily be flat, and may be formed in the shape of a convex lens.

Figure 7:
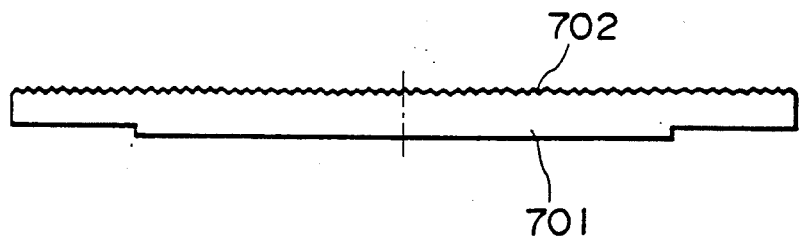
FIG. 7 is a cross section illustrating a light-scattering member used in an illuminator as a fourth embodiment of the present invention.

FIG. 7 illustrates another embodiment in which the light-scattering member 104 used in the embodiment of FIG. 1 is formed as a single member. The numeral 701 denotes a transparent or translucent member having a light-scattering surface 702, which may be formed of PMMA or a glass sheet, and the light-scattering surface 702 can be roughened by a non-glare treatment. The present embodiment brings about additional advantages such that it becomes possible to make the illuminator thinner than that of the first embodiment, and the number of parts can be reduced. The present embodiment can be also applied in the second and third embodiments.

Figure 8:
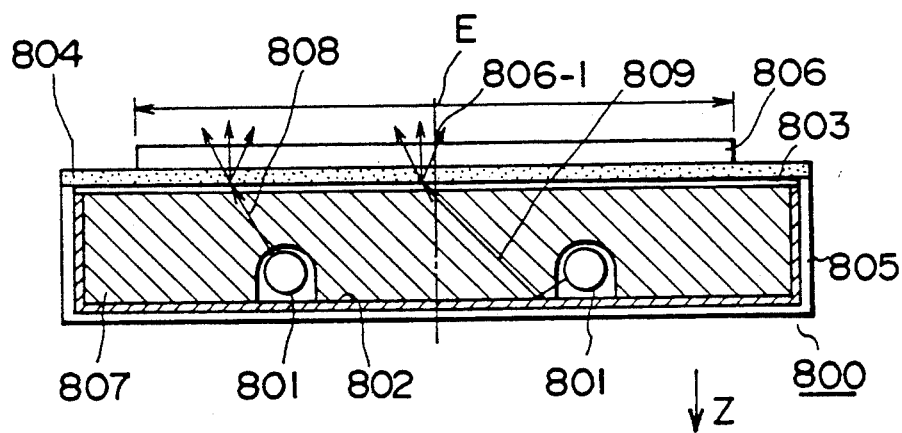
FIG. 8 is a cross section illustrating an illuminator of the present invention and a display panel employing the same.

Other embodiments of the illuminator according to the present invention will be described below with reference to the drawings. FIG. 8 is a cross section of another illuminator of the present invention and a display panel employing the same. A light-transmitting member 807 is formed of, for example, a transparent or translucent substance such as polymethyl methacrylate (PMMA) or glass, and has a groove or a hole serving as a hollow space for disposing therein a light source 801. Next, a light-reflecting member 802 comprises a film having a mirror surface, and can be obtained, for example, by forming a metal such as aluminum, chromium or silver into a film by vapor deposition. The light-reflecting member 802 is provided on end surfaces other than the light-outgoing surface of the light-transmitting member 807, and they are fixed each other through an adhesive. The light-reflecting member is also mutually fixed to a housing 805, and consequently the light-transmitting member 807 and the housing 805 are fixed each other. A light screen 803 comprises, for example, a polyester film on which opaque materials are provided in the form of dots by vapor deposition or printing, and density distribution is formed on the part of the dot-like opaque materials so that the beams that come in the light screen 803 from the light-transmitting member 807 may be brought into outgoing beams having uniform distribution. The light screen 803 also comes into surface contact with the light-outgoing surface of the above light-transmitting member 807, and closely fixed thereto by adhesion.

A light-scattering member 804 can be made from a milk-white translucent substance. As such a substance, there can be used particularly surface-roughened PMMA or a glass sheet, or PMMA containing crystalline particles having a high refractive index. The light-scattering member 804 and the light screen 803 further come into surface contact with the light-transmitting member 807, and are fixed on the light-transmitting member 807 through an adhesive or other means.

Next, description will be made on how the illuminator 800 illustrated in FIG. 8 works and is constituted as described above. Part 808 of light rays emitted from a long-size light source 801 as exemplified by a fluorescent lamp disposed inside the effective illumination region E of the liquid crystal display panel 806 travels inside the light-transmitting member 807. Also, another light ray 809 reflects on the light-reflecting member 802, and thereafter travels inside the light-transmitting member 807. These light rays undergo appropriate attenuation on the light screen 803, and reach the light-scattering member 804, being converted into scattered light there, thus illuminating the liquid crystal display panel 806 from its back side.

Figure 9A:
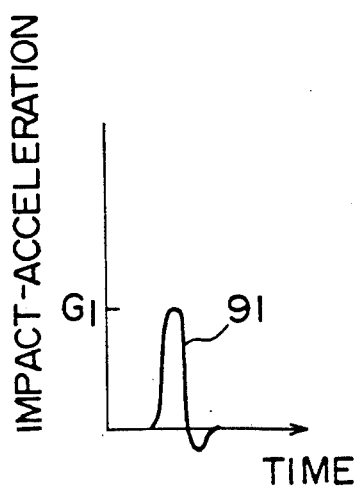
FIGS. 9A and 9B are characteristic representations of waveforms of the drop impact exerted on a display panel when an illuminator of the present invention is used.
Figure 9B:
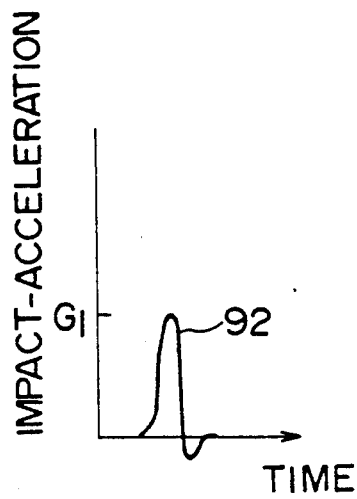

The present embodiment brings about the following advantages. Namely, since the light-scattering member 804 is closely fixed by surface contact to the light-transmitting member 807 interposing the light screen 803, the light-scattering member 804 may not vibrate even when the drop impact is given thereto, so that no excessive impact-acceleration may be given to the liquid crystal display panel 806. FIGS. 9A and 9B show impact waveforms observed when with respect to the illuminator 800 of the present invention on which the ferroelectric liquid crystal display panel 806 was mounted, the same drop test as in the instance of FIG. 3 was carried out. Waveform 92 shown in FIG. 9B, of the impact-acceleration given to the central surface 806-1 of the ferroelectric liquid crystal display panel 806 is similar to the preset acceleration $G_1$ shown in FIG. 9A, of a drop test machine, proving that no sanded texture was generated in the ferroelectric liquid crystal display panel 806. In an instance in which the liquid crystal display panel 806 is kept apart from the light-scattering member 804 so as to be held upward, the liquid crystal display panel 806 must, as a matter of course, be supported and fixed by other means at its bottom periphery. Since in such an instance the liquid crystal display panel 806 is brought into a suspended state, an excessive impact-acceleration is applied to the liquid crystal display panel 806 when the drop impact is given thereto, resulting in appearance of sanded texture.

Figure 10:
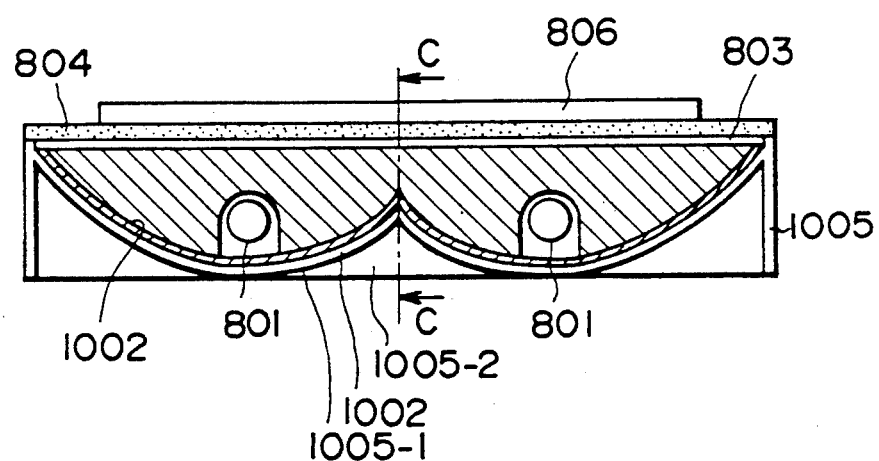
FIG. 10 is a cross section illustrating an illuminator according to another embodiment of the present invention and a display panel employing the same.

FIG. 10 illustrates a fifth embodiment of the present invention. This is an embodiment such that the present invention is applied in an instance where, in the fourth embodiment of FIG. 8, the shape of the reflecting sheet has been modified to constitute a curved surface so that a further highly luminous illuminator can be obtained.

Figure 11:
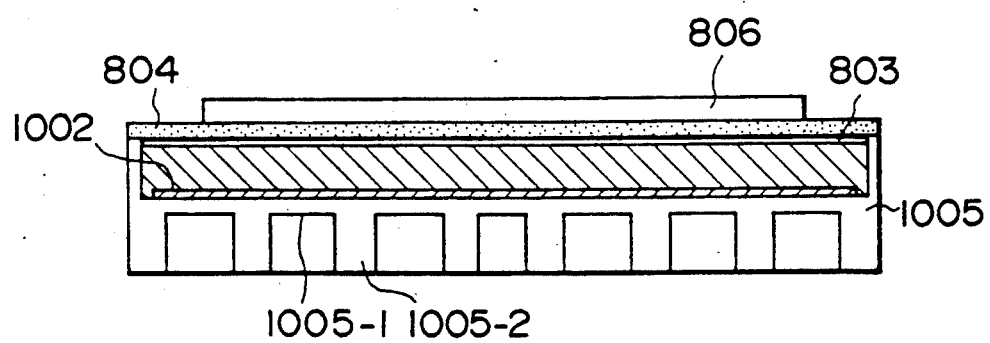
FIG. 11 is a cross section along the line C—C in FIG. 10.

In the figure, the same numerals as in FIG. 8 denote same members. In the present embodiment, the bottom 1002-1 of the light-reflecting member is not level. FIG. 11 is a cross section along the line C—C in FIG. 10, where a plurality of projections 1005-2 are provided to the undersurface 1005-1 of the housing, thus giving the structure that the shape of the undersurface 1005-1 of the housing can not be deformed with ease even by impact force exerted in the direction Z. Thus, the light-scattering member 804 may not vibrate even when the drop impact is given thereto, so that no excessive impact-acceleration may be given to the liquid crystal display panel 806. Here, the projections 1005-2 may not have the structure that each of them is independent, but may have a packed structure such that the undersurface 1005-1 of the housing comes into contact with its floor level.

Figure 12:
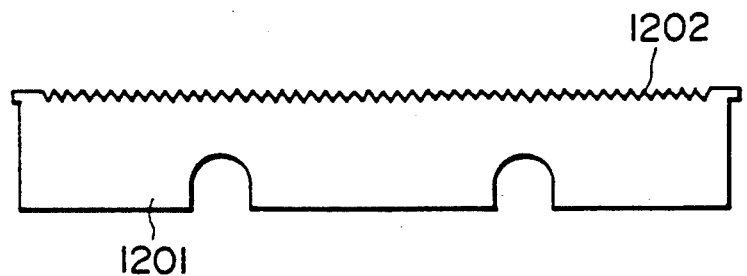
FIG. 12 is a cross section illustrating an illuminator according to still another embodiment of the present invention.
Figure 13:
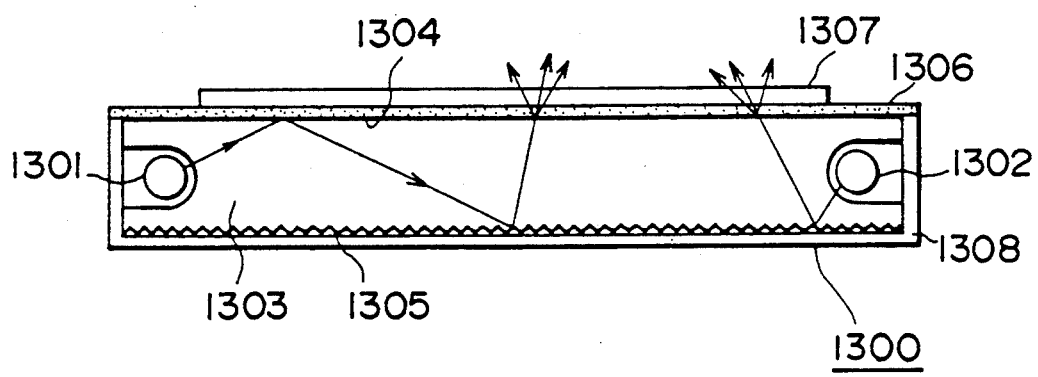
FIG. 13 is a cross section illustrating a prior art illuminator and a display panel employing the same.

FIG. 12 illustrates still another embodiment in which the light screen 803 used in the embodiment of FIG. 8 is formed integrally with the light-transmitting member 807. A light-transmitting member 1201 comprises a transparent or translucent member having a light-scattering surface 1202, and is made from PMMA or a glass sheet, or PMMA containing crystalline particles having a high refractive index. Since the light-scattering surface 1202 has a distribution to the extent of the scattering of light, the density of beams outgone to the light-scattering member 804 can be controlled to a uniform state, and also can have a function as the light screen 803. The present embodiment brings about an additional advantage such that the number of parts can be reduced from that of the forth embodiment. The present embodiment can be also applied to the fifth embodiment.

Usable as the liquid crystal display panels used in the present invention are ferroelectric liquid crystal display panels disclosed in U.S. Pat. Nos. 4,367,924, 4,639,089, 4,655,561, etc. In particular, a large effect can be exhibited with respect to ferroelectric liquid crystal display panels in which the film thickness of a chiral smectic liquid crystal that shows ferroelectric properties in set to a film thickness sufficiently small to unwind a helical structure inherent in the chiral smectic liquid crystal. Such ferroelectric liquid crystal display panels are designed to give a very small cell thickness of from 0.5 μm to 2 μm in approximation, and hence they have had the problem that the alignment disturbance such as sanded texture tends to occur when a shock (impact) is given. Employment of the illuminator of the present invention has made it possible to solve such problems.

In the above embodiments, descriptions have been made using the ferroelectric liquid crystal display panels as liquid crystal display panels, but, without limitation thereto, the present invention can be also effective to twisted-nematic liquid crystal display panels conventionally used as display panels. Also, in the embodiments of FIG. 5 and FIG. 6, the transparent sheet-like members that form the light-transmitting member are used in the lamination number of six, but, without limitation thereto, the lamination number can be increased or reduced depending on the effective illumination area.

Also in respect of the number of light source descriptions have been made on the instances where two light sources are used, but one light source may be used, or a similar effect can be obtained also when three or more light sources are used. In the instance where three or more light sources are used, it is possible to provide an illuminator for a liquid crystal display panel having a still larger area than the instance where two light sources are used.

The illuminator of the present invention has made it possible to provide a surface illuminator that can remarkably reduce the shock given to a ferroelectric liquid crystal display panel as compared with conventional illuminators, and may not cause any alignment disturbance such as sanded texture, while retaining the performances that it promises a high utilization rate of beams from light sources and at the same time can achieve uniform surface illumination.

We claim:

1. An illuminator comprising:
    a light-transmitting member formed of a plurality of transparent sheet-like members laminated to each other;
    light source means disposed on a light-incoming side of said light-transmitting member;
    a light-reflecting member disposed on a light-outgoing side of said light-transmitting member at an oblique angle to said transparent sheet-like members; and
    a sheet-like member having a scattering area at which a light ray reflected from said light-reflecting member is converted into scattered light and coming into surface contact with said light-transmitting member, wherein
    said light-transmitting member, said light source, said light-reflecting member and said sheet-like member are supported by a housing, and an undersurface of said housing is formed in the form of a taper or convex shape and provided with a plurality of projections.

2. The illuminator of claim 1, wherein said sheet-like member comprises a diffusion sheet comprising a milk-white light-transmissive substance, and a transparent or translucent member.

3. The illuminator of claim 1, wherein said sheet-like member comprises a transparent or translucent member, whose light-outgoing surface has been roughened.

4. The illuminator of claim 1, wherein said sheet-like member is disposed on the light-outgoing side of said light-transmitting member, and part of said sheet-like member is disposed around said light source.

5. The illuminator of claim 1, wherein said light source means comprises one or two light sources.

6. An illuminator comprising:
    light source means and a light-scattering member for illuminating an object to be illuminated from its back surface, and
    a light-transmitting member having space therein for disposing said light source, with said light-scattering member being disposed between said light source and said object to be illuminated, said light-transmitting member being formed of a solid material capable of propagating a light ray outgoing from said light source toward said light-scattering member, and said space being provided within an effective illumination region of said object to be illuminated, wherein said light-transmitting member and said light-scattering member are independently disposed, and a light screen having opaque portions is closely fixed between said light-transmitting member and said light-scattering member.

7. The illuminator of claim 6, wherein said light-transmitting member and said light source means are supported by a housing, and a bottom surface of said housing is formed in the form of a taper or convex shape and provided with a plurality of projections.

8. The illuminator of claim 7, wherein said light source means comprises one or more light sources.

9. The illuminator of claim 6, wherein said light source means comprises one or more light sources.

10. A display apparatus comprising:
an illuminator comprising a set of first and second light-transmitting members each formed of a plurality of transparent sheet-like members having light-outgoing ends and being laminated to each other, with said light-transmitting members being disposed so that said ends of said first and second light-transmitting members face each other;
a light source disposed on a light-incoming side of each of said light-transmitting members;
a light-reflecting member disposed at said light-outgoing ends of said light-transmitting members; and
a sheet-like member having a scattering area at which a light ray reflected from said light-reflecting member is converted into scattered light and coming into surface contact with said light-transmitting members; and
a chiral smectic liquid crystal display panel fixed to said illuminator and disposed so as to come into contact with said sheet-like member.

11. The display panel of claim 10, wherein said chiral smectic liquid crystal is set to a film thickness sufficiently small to unwind a helical inherent in the chiral smectic liquid crystal when no electric field is formed.

* * * * *

UNITED STATES PATENT AND TRADEMARK OFFICE
CERTIFICATE OF CORRECTION

PATENT NO. : 5,046,826

DATED : September 10, 1991

INVENTOR(S) : Hirofumi Iwamoto, et al.

It is certified that error appears in the above-identified patent and that said Letters Patent is hereby corrected as shown below:

COLUMN 10:

Line 1, "source" should read --sources,--.

COLUMN 12:

Line 17, "helical" should read --helical structure--.

Signed and Sealed this

Thirtieth Day of March, 1993

*Attest:*

STEPHEN G. KUNIN

*Attesting Officer*  Acting Commissioner of Patents and Trademarks